US010289613B2

(12) United States Patent
Shershevsky et al.

(10) Patent No.: US 10,289,613 B2
(45) Date of Patent: May 14, 2019

(54) ELEMENT IDENTIFIER GENERATION (71) Applicant: HEWLETT PACKARD ENTERPRISE DEVELOPMENT LP, Houston, TX (US)

(72) Inventors: Olga Shershevsky, Yehud (IL); Aviad Israeli, Yehud (IL); Oded Gazit, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 82 days.

(21) Appl. No.: 15/509,470

(22) PCT Filed: Feb. 24, 2015

(86) PCT No.: PCT/US2015/017185
§ 371 (c)(1),
(2) Date: Mar. 7, 2017

(87) PCT Pub. No.: WO2016/137435
PCT Pub. Date: Sep. 1, 2016

(65) Prior Publication Data
US 2017/0286473 A1 Oct. 5, 2017

(51) Int. Cl.
*G06F 16/22* (2019.01)
*G06F 16/23* (2019.01)
*G06F 16/31* (2019.01)
*G06F 16/93* (2019.01)

(52) U.S. Cl.
CPC ...... *G06F 16/2358* (2019.01); *G06F 16/2228* (2019.01); *G06F 16/2379* (2019.01); *G06F 16/313* (2019.01); *G06F 16/93* (2019.01)

(58) Field of Classification Search
CPC ...... G06F 9/542; G06F 11/3636; H04L 67/16; H04L 43/0876
See application file for complete search history.

(56) References Cited

U.S. PATENT DOCUMENTS

| 7,330,887 B1 | 2/2008 | Dharmadhikari |
| 7,441,195 B2 | 10/2008 | Error et al. |
| 8,079,037 B2 | 12/2011 | Lui et al. |
| 8,504,913 B2 | 8/2013 | Marchant et al. |
| 2009/0138589 A1 | 5/2009 | Wunderlich |

(Continued)

OTHER PUBLICATIONS

Andrica, S. et al., "WaRR: A Tool for High-Fidelity Web Application Record and Replay," (Research Paper), Jun. 2011, 8 pages, available at http://dslab.epfl.ch/pubs/WaRR.pdf.

(Continued)

*Primary Examiner* — Charles E Anya (57) ABSTRACT

Example implementations disclosed herein relate to a system for generating an element identifier comprising an action engine to receive an action associated with an element of a structured document and to measure a metric associated with the received action. The system may further comprise an element engine to determine whether the element comprises a targeted element and, in response to determining that the element comprises the targeted element, generate a unique identifier according to a modified attribute of the element. The system may further comprise a log engine to create a log record comprising the unique identifier and the metric associated with the received action.

14 Claims, 8 Drawing Sheets

(56) References Cited

U.S. PATENT DOCUMENTS

| | | | |
|---|---|---|---|
| 2009/0271514 A1* | 10/2009 | Thomas | G06F 11/3438 |
| | | | 709/224 |
| 2011/0167156 A1* | 7/2011 | Mani | H04L 67/125 |
| | | | 709/224 |
| 2013/0021345 A1 | 1/2013 | Hsiao et al. | |
| 2013/0232424 A1* | 9/2013 | Nakagoe | G06F 3/0484 |
| | | | 715/738 |
| 2013/0332813 A1 | 12/2013 | Heinrich et al. | |
| 2014/0136693 A1 | 5/2014 | Greifeneder et al. | |
| 2014/0143304 A1* | 5/2014 | Hegarty | G06F 11/3438 |
| | | | 709/203 |
| 2015/0254219 A1* | 9/2015 | Harel | G06Q 30/00 |
| | | | 715/234 |

OTHER PUBLICATIONS

International Search Report & Written Opinion received in PCT Application No. PCT/US2015/017185, Nov. 24, 2015, 9 pages.

\* cited by examiner

ELEMENT IDENTIFIER GENERATION

BACKGROUND

Some web-based or mobile application offers a number of ways to interact with users. For example, a user may select various elements on a web page, such as a search box, a list item, a link, an image, etc. In some cases, the creator of the application desires to measure the performance of the application in response to the user actions, such as by determining how long a given action takes to complete. Multiple elements within the application may represent functionally similar yet visually distinct elements, such as each item in a list of search results or each item in a menu. The action performance with respect to such similar elements may be desired to be tracked as a group, rather than individually, to simplify performance analysis

BRIEF DESCRIPTION OF THE DRAWINGS

In the accompanying drawings, like numerals refer to like components or blocks. The following detailed description references the drawings, wherein.

DETAILED DESCRIPTION

As described above, a typical interface for a web application comprises numerous elements, such as images, links, menus, text descriptions, etc. These elements may be associated with commands that may be performed by the application in response to events, such as loading the page, script executions, and/or user actions. Accordingly, as described in detail below, various example implementations relate to generating identifiers for the various elements, evaluating metrics associated with commands performed on those elements, and logging the metrics for performance review and analysis.

In the description that follows, reference is made to the term, "machine-readable storage medium." As used herein, the term "machine-readable storage medium" refers to any electronic, magnetic, optical, or other physical storage device that stores executable instructions or other data (e.g., a hard disk drive, random access memory, flash memory, etc.).

Figure 1:
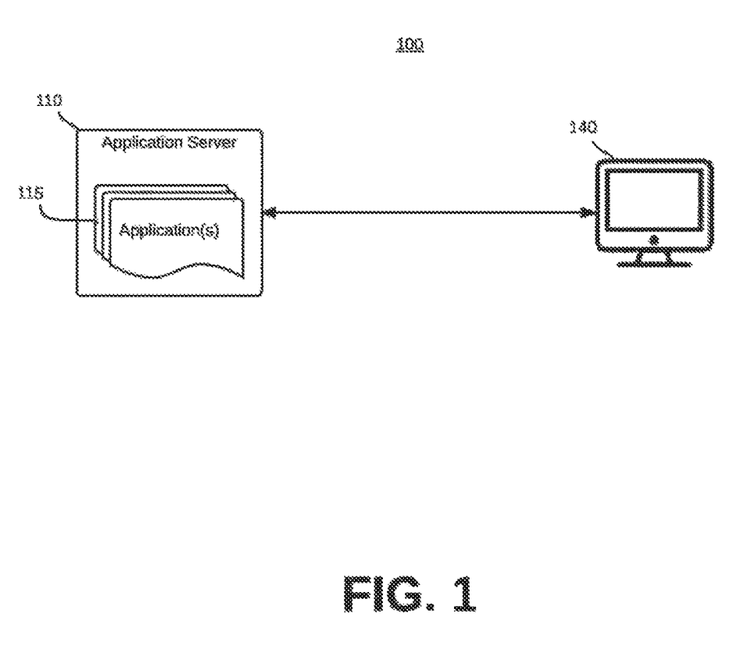
FIG. 1 is a block diagram of an implementation of a system for element identifier generation consistent with disclosed implementations.

Referring now to the drawings, FIG. 1 is a block diagram of an implementation of a system 100 for element identifier generation consistent with disclosed implementations. System 100 may comprise, for example, an application server 110 and a client 140. Application server 110 and client 140 may communicate with each other via a direct connection and/or a network. A network may be any type of network that facilitates communication between remote components. For example, the network may comprise a local area network (LAN), a wide area network (WAN), a virtual private network, a dedicated intranet, the Internet, a cellular network, a radio network, and/or a wireless network.

Application server 110 and client 140 may each comprise a general and/or special purpose computer, server, mainframe, desktop, laptop, tablet, smart phone, game console, and/or any other system capable of providing computing capability consistent with providing the implementations described herein.

Although one application server 110 and one client 140 are depicted in FIG. 1, certain implementations of system 100 may comprise more than one application server 110 and/or client 140. At least one of the servers may be employed and arranged, for example, in at least one server bank, computer bank, data center, and/or other arrangements. For example, the server computers together may include a cloud computing resource, a grid computing resource, and/or any other distributed computing arrangement. Such server computers may be located in a single installation and/or may be distributed among many different geographical locations.

Client 140 may comprise a display device, such as a cathode ray tube (CRT) monitor, a liquid crystal display (LCD) screen, or a screen implemented using another display technology. However, any suitable display may be used. The display device may be internal or external to client 140 depending on the configuration of system 100.

In some implementations, system 100 may monitor the user experience of a plurality of application(s) 115 executed on application server 110 and provide performance and stability measurements on actions taken by a user via client 140.

User actions in application(s) 115 may be translated into events that may be manipulated through code and/or scripts such as ASP, Java, Objective C, and various other programming languages. Whenever a user initiates an action (e.g. touch, swipe) on the user client, a sequence of events (e.g. touchstart, click, touchend) may be triggered so that the application(s) 115 may process the action.

System 100 may identify, classify and metric user actions. Classifying user actions may comprise generating an identifier (Id) for the action. A user action may be classified by the gesture that was used by the user (e.g. tap, swipe etc.) and the element of the application(s) 115 affected by the gesture (e.g. a button, a list item, etc.). User actions may be classified in order to measure and/or display performance metrics on it (e.g. "the average time it took to complete the action").

When trying to classify a user action, system 100 may classify the actual target element for the gesture instead of an element associated with an action handler for the received user action. Each element of application(s) 115 may be associated with a plurality of event handlers for the various events triggered by user actions, such as touchstart, click, touchend, etc. Some event handlers may comprise action handlers that may be called by these event listeners when their respective events are triggered in order to perform functionality for application(s) 115.

For example, if the user taps on a menu of different options in application(s) 115, system 100 may classify each option as a different user action. In some implementations, system 100 may classify multiple elements, such as a list of catalog items displayed by application(s) 115, as one generic element. System 100 may analyze and process the Document Object Model (DOM) structure of an element to produce an Id and a name that will be unique for elements with different functionality and identical for elements with the same functionality even though they may appear as different elements to the user.

Figure 2:
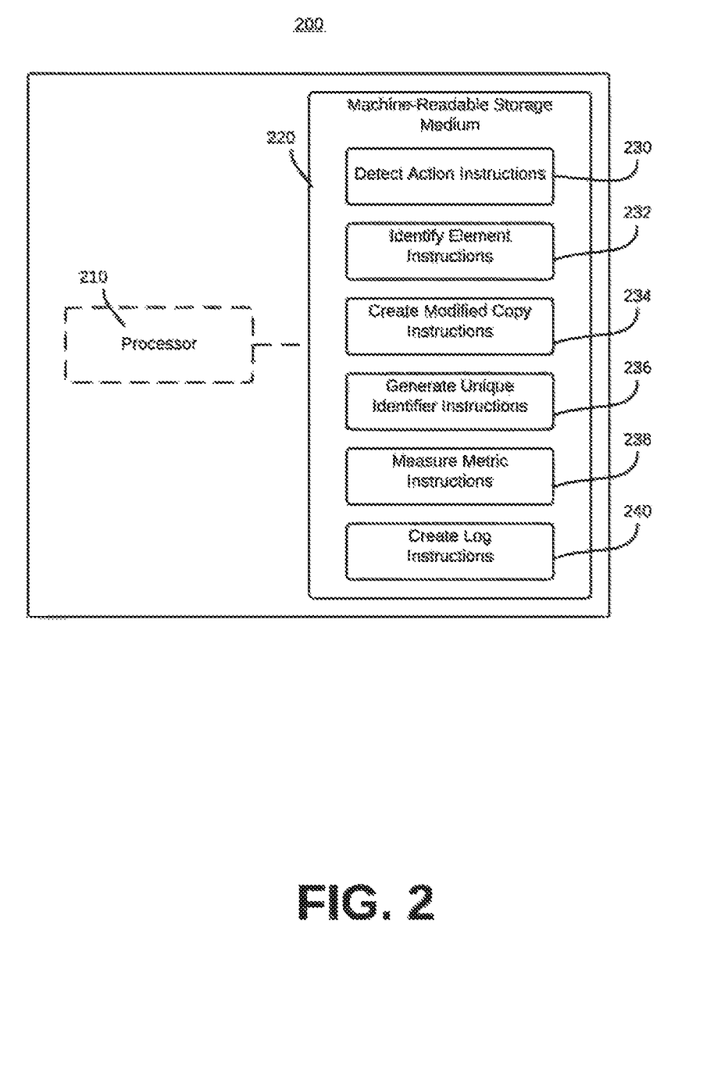
FIG. 2 is a block diagram of an example element identifier generation device consistent with disclosed implementations.

FIG. 2 is a block diagram of an example element identifier generation device 200 consistent with disclosed implementations comprising a processor 210 and a non-transitory machine-readable storage medium 220. Element identifier generation device 200 may comprise a computing device such as a desktop computer, a laptop computer, a handheld computing device, a mobile phone, or the like. Processor 210 may be a central processing unit (CPU), a semiconductor-based microprocessor, or any other hardware device suitable for retrieval and execution of instructions stored in machine-readable storage medium 220. In particular, processor 210 may fetch, decode, and execute a plurality of detect action instructions 230, identify element identification instructions 232, create modified copy instructions 234, generate unique identifier instructions 236, measure metric instructions 238, and create log instructions 240 to implement the functionality described in detail below.

Executable instructions such as detect action instructions 230, identify element identification instructions 232, create modified copy instructions 234, generate unique identifier instructions 236, measure metric instructions 238, and create log instructions 240 may be stored in any portion and/or component of machine-readable storage medium 220. The machine-readable storage medium 220 may comprise both volatile and/or nonvolatile memory and data storage components. Volatile components are those that do not retain data values upon loss of power. Nonvolatile components are those that retain data upon a loss of power.

The machine-readable storage medium 220 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, and/or a combination of any two and/or more of these memory components. In addition, the RAM may comprise, for example, static random access memory (SRAM), dynamic random access memory (DRAM), and/or magnetic random access memory (MRAM) and other such devices. The ROM may comprise, for example, a programmable read-only memory (PROM), an erasable programmable read-only memory (EPROM), an electrically erasable programmable read-only memory (EEPROM), and/or other like memory device.

Machine-readable storage medium 220 may be encoded with executable instructions comprising, for example, at least a portion of an operating system (OS) of element identifier generation device 200 or a separate application running on top of the OS to present a user interface. As another example, the executable instructions may be included in a web browser, such that the web browser implements the interface described in detail herein. In some implementations, the executable instructions may be implemented in web-based script interpretable by a web browser, such as JavaScript. Other suitable formats of the executable instructions may be used.

More specifically, machine-readable storage medium 220 may be encoded with detect action instructions 230 to detect and receive an action associated with a structured document. For example, application 115 comprising a DOM-based structured web document may be displayed on client 140. A user of client 140 may tap an element of application 115 causing application 115 to trigger an action handler on that element. Detect action instructions 230 may inject code into the action handler that may be executed in response to the user's tapping on the element.

For example, a web application associated with the structured document may comprise a JavaScript built-in function "addEventListener." During the loading of the application, this built-in function may be overridden with a function to save the element that triggered the action for further processing as a targeted element.

Machine-readable storage medium 220 may be encoded with element identification instructions 232 to identify the element of the structured document associated with the detected action. Element identification instructions 232 may comprise instructions to identify a selected element associated with the action and determine whether the selected element comprises a targeted element.

In some implementations, an element selected by a user may not comprise the targeted element that was previously registered with "addEventListener", but may comprise one of its child elements. For example, the action handler may be registered to a table row that contains text and images. The user selected element may comprise the text element and/or the image element, while the table row comprises the targeted element.

Determining whether a selected element comprises a targeted element may allow device 200 to identify an element that the application developer is interested in even if the user's action is on a different and/or related element. For example, identify element instructions 232 may determine whether the selected element comprises a style element, whether the selected element comprises a parent element with a plurality of child elements, and/or determine whether an amount of display space occupied by the selected element exceeds a threshold amount.

In some implementations, certain element types, such as style elements may cause identify element instructions 232 to seek a targeted element when they are selected. Selection of the style element by a user may result in a parent and/or child element of the style element instead being identified as the targeted element.

In some implementations, a child element may be selected by the user, while a parent element may comprise the targeted element. Tapping on these different child elements inside the same parent html element (a table row, for example) may then be classified under the same Id for the targeted element.

In some implementations, if the selected element does not have an overridden event listener, identify element instructions 232 may scan the document structure to find a parent element. If the document root is reached, or if the parent element of the selected element occupies greater than a threshold amount of display space (e.g., greater than 70% of the screen), the selected element may be designated as the target element. Otherwise, the parent element may be designated as the targeted element.

Machine-readable storage medium 220 may be encoded with create modified copy instructions 234 to create a modified copy of the identified element. For example, JavaScript may be used in the action handler to create a copy of the "this" structure associated with the targeted element. The copy of the element structure may be manipulated without affecting other functionality of the application.

Machine-readable storage medium 220 may be encoded with generate unique identifier instructions 236 to generate a unique identifier associated with the modified copy of the identified element. For example, generate unique identifier instructions 236 may create a copy of a data structure associated with the identified element, apply a modification rule to the copy of the data structure, generate a name for the identified element, and convert the copy of the data structure to a hash code. In some implementations, the modification rule applied to the data structure may remove an attribute from the copy of the data structure.

Generation of the unique identifier may create a modified DOM-based structure of the element and turn it into a string that represents the Id. If several elements of the application comprise different content but the same DOM structure and base uniform resource locators (URLs), the modification rules applied to each of those elements may result in the same Id allowing their metrics and performance to be aggregated.

In some implementations, generation of the Id may apply several modification rules by iterating over a plurality of nodes comprising the element. For example, a modification rule may remove text nodes from the element and/or remove certain attributes from nodes, such as "style", "alt", and/or "src" attributes. In some implementations, the attributes may be modified, such as by removing parameters from a URL and/or removing numeric values.

In some implementations, a standard set of modification rules, such as those described above may be used for the application, in some implementations, administrators and/or developers of the application may add, modify, and/or remove modification rules to suit their application. For example, an application developer may provide a regular expression (regex) to be applied to the nodes of the element that takes into account the coding style of the particular application.

Generate unique Identifier instructions 236 may create a hash code from the resulting modified element structure. Hash code creation converts a string into an integer. For example, JavaScript may use a "hashCode" function that takes a string as an input variable and returns an integer value based on the character code values of the characters in the string. An example of such a hashCode function is listed below in Table 1. Numerous other hash functions are available, such as djb2 in C and the md5 algorithm.

TABLE 1 hashCode Function

```
var hashCode = function( ) {
    var hash = 0, i, chr, len;
    if (this.length == 0) return hash;
    for (i = 0, len = this.length; i < len; i++) {
        chr = this.charCodeAt(i);
        hash = ((hash << 5) - hash) + chr;
        hash |= 0; // Convert to 32bit integer
    }
    return hash;
};
```

Machine-readable storage medium 220 may be encoded with measure metric instructions 238 to measure a metric associated with the action. For example, the metric associated with the action may comprise an amount of time taken to complete the action and/or an amount of resources (e.g., memory, storage, processing power, etc.) consumed by performing the action.

Machine-readable storage medium 220 may be encoded with create log instructions 240 to create a log record comprising the unique identifier and the measured metric associated with the action. For example, a log record may be submitted to a log database for aggregation with other measured metrics. Performance analysis reports on the application may then be produced and reviewed by the application developer.

Figure 3:
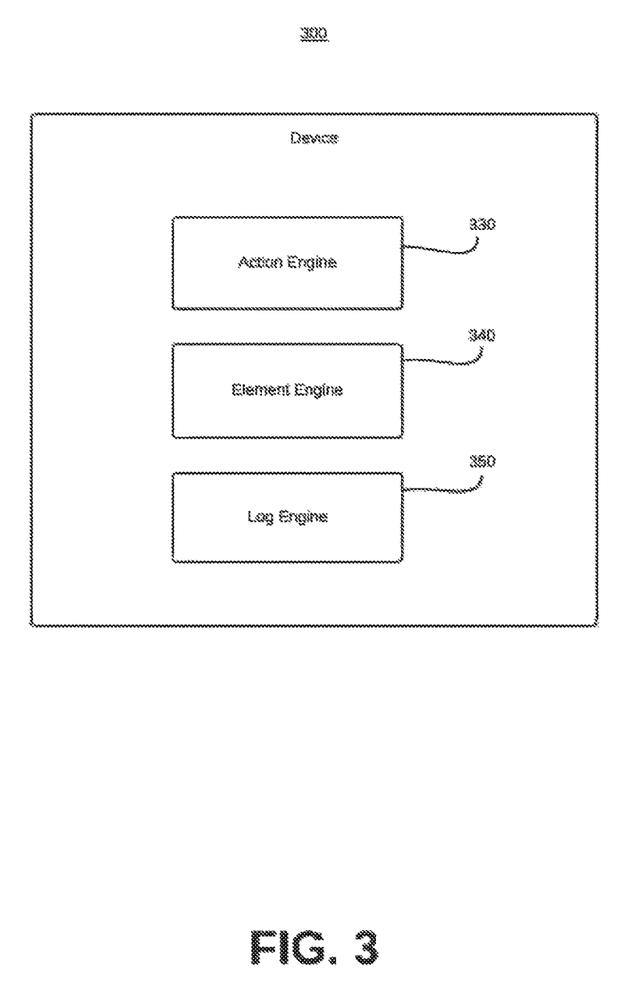
FIG. 3 is a block diagram of an example computing device consistent with disclosed implementations.

FIG. 3 is a block diagram of an example device 300 consistent with disclosed implementations. As illustrated, computing device 300 may comprise an action engine 330, an element engine 340 and a log engine 350. Action engine 300, element engine 340, and log engine 350 may each comprise, for example, instructions stored a machine readable medium executable by a processor, logic circuitry, and/or other implementations of hardware and/or software.

Action engine 330 may receive an action associated with an element of a structured document. For example, action engine 330 may comprise an action handler in an application. When a user performs an action on the application, such as clicking on an element, an action handler such as "mouseDown" may be called to process that action.

Action engine 330 may also measure a performance metric associated with the action, such as an amount of data transferred, an amount of time taken to complete the action, and/or an amount of resources consumed by performing the action.

In some implementations, element engine 340 may determine whether the element associated with the action comprises a targeted element and, in response to determining that the element comprises the targeted element, generate a unique identifier according to a modified attribute of the element. In response to determining that the element does not comprise the targeted element, element engine 340 may identify a second element as the targeted element.

Determining whether the element associated with the action comprises a targeted element may allow element engine 340 to identify an element that the application developer is interested in even if the user's action is on a different and/or related element. For example, similarly to element identification instructions 232, element engine 340 may determine whether the selected element comprises a style element, whether the selected element comprises a parent element with a plurality of child elements, and/or determine whether an amount of display space occupied by the selected element exceeds a threshold amount.

Element engine 340 may modify portions of the targeted element. For example, the targeted element may comprise a DOM-based data structure comprising a plurality of nodes. Each node may comprise a plurality of attributes. Element engine 340 may apply modification rules such as those described above with respect to identifier generation instructions 236. In some implementations, the modification rules may remove a character type from the attribute and/or remove an attribute, such as a style, alt, link, or source attribute, from the data structure.

In some implementations, the identifier (Id) for the element may be generated by element engine 340. For example, element engine 340 may create a hash code of the resulting text in the DOM-based data structure after applying the modification rules.

In some implementations, element engine 340 may generate a name for the element according to a label, title, alt, and/or name attribute. For example, an HTML form element may have a label attribute associated with an input for the form. This label may be used as the name for the element. For another example, many html elements, such as "input", "a", "form", "button", "iframe", etc., support a name and/or id attribute that may be used as the name for the element. Similarly, the value of an "alt" or "title" attribute may also be used as the element name for those elements that support it.

In some implementations, the name for the element may be generated based on the type of element. For example, for an "HTML" element, a document title attribute may be used as the element name. For a select element, a selected option text may be used as the element name.

Log engine 350 may create a log record comprising the unique identifier and a metric associated with the received action. Log engine 350 may further create the log record further comprising a name for the element generated by element engine 340.

In some implementations, action engine 330, element engine 340, and log engine 350 may interact with each other and/or other applications through the use of an Application Programming Interface (API). In particular, an API of an application, whether locally-executed or web-based, may expose a number of functions to other applications. Similarly, an API of an operating system may expose a number of functions used to control the functionality of the OS.

Figure 4:
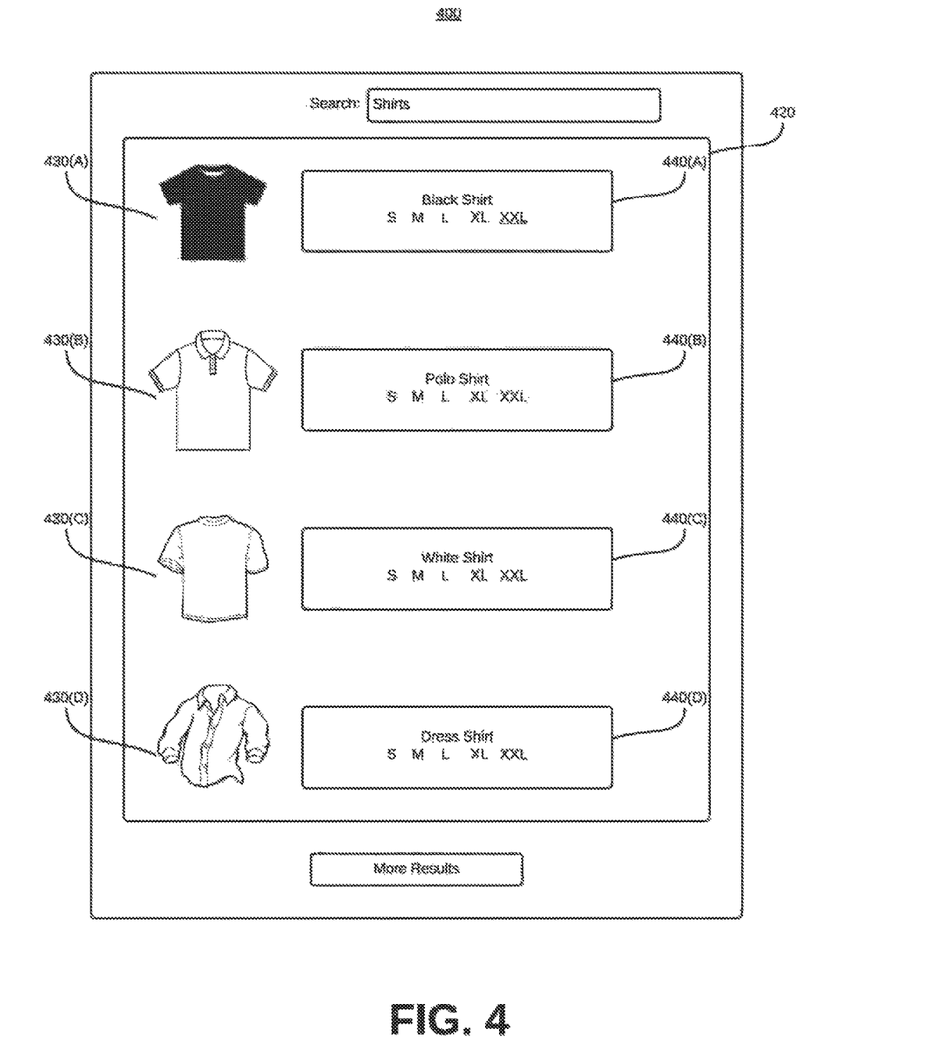
FIG. 4 is an example of an implementation of an application consistent with disclosed implementations.

FIG. 4 is an example of an implementation of an application 400 consistent with disclosed implementations. Application 400 may comprise, a list display area 420, a plurality of list item images 430(A)-(D), and a plurality of list item descriptions 440(A)-(D). For example, images 430(A)-(D) and their respective descriptions 440(A)-(D) may comprise results from a search entered by a user in a search box.

Images 430(A)-(D) and descriptions 440(A)-(D) may comprise elements of a structured document. In some implementations, an action received by the application may comprise a selection of one of these elements, such as image 430(A). The targeted element may comprise a parent element, such as a table row, comprising both image 430(A) and description 440(A) as child elements.

Figure 5:
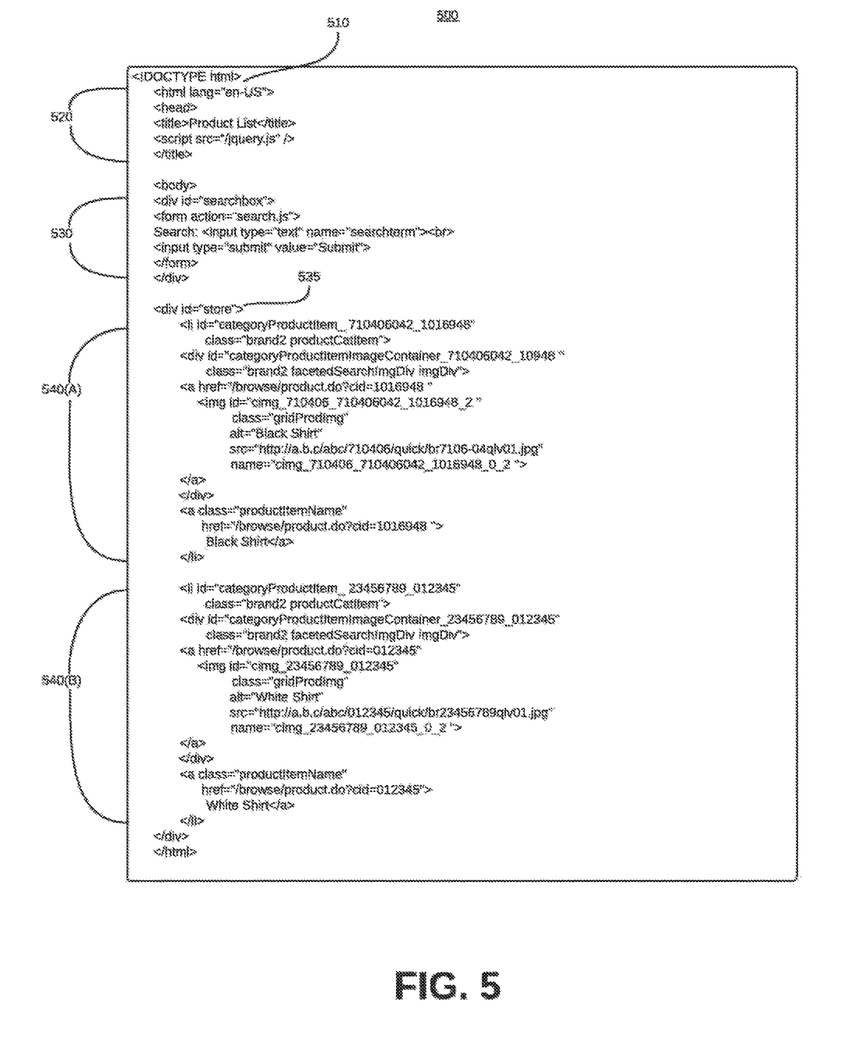
FIG. 5 is an example document object model structure for a web application consistent with disclosed implementations.

FIG. 5 is an example document object model (DOM) structure 500 for a web application consistent with disclosed implementations. DOM structure 500 may comprise a plurality of structured elements, each comprising a plurality of nodes. DOM structure 500 is presented for example purposes; some elements used in production applications may be omitted for clarity and ease of explanation.

A first element 510 may identify the type of document; in this example, an HTML document. A second element 520 may comprise informational nodes such as a title node and a script link node. A third element 530 may comprise a plurality of nodes associated with providing a search input for the application.

A parent element 535 may comprise a plurality of child elements 540(A)-(B). For example, parent element 535 may correspond to list display area 420 and child elements 540(A)-(B) may correspond to list item images 430(A)(B) and list item descriptions 440(A)-(B).

Figure 6:
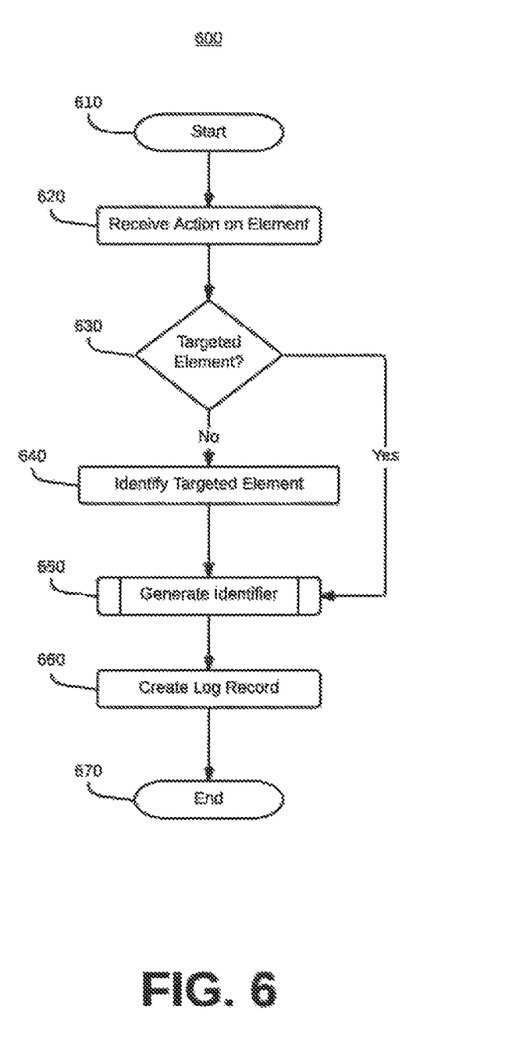
FIG. 6 is a flowchart of an implementation of a method for measuring and logging metrics consistent with disclosed implementations.

FIG. 6 is a flowchart of an implementation of a method for measuring and logging metrics consistent with disclosed implementations. Although execution of method 600 is described below with reference to the components of system 100, other suitable components for execution of method 600 will be apparent to those of skill in the art. Method 600 may be implemented in the form of executable instructions stored on a machine-readable storage medium, such as machine-readable storage medium 220 of device 200.

Method 600 may start in block 610 and proceed to block 620 where system 100 may receive an action on an element. For example, an action handler of detect action instructions 230 and/or action engine 330 associated with child element 540(A) may be called in response to a user of client 140 clicking on list item image 430(A). The action handler may be associated with an event listener, such as "touchStart" and/or "mouseDown".

Method 600 may then advance to stage 630 where system 100 may determine whether the element associated with the action comprises a targeted element. A targeted element may comprise a functional element of the application in which the developer is interested in measuring performance. In some implementations, targeted elements may be identified as those elements that have had their default action handlers overridden with application functionality. Determining whether a selected element comprises a targeted element may allow system 100 to identify an element, using identify element instructions 232 and/or element engine 340, that the application developer is interested in even if the user's action is on a different and/or related element.

For example, a user of client 140 may tap an image in a list when the application functionality is called from an action handler on a table row comprising the image and a description. System 100 may identify the correlation between the image and the description by determining that both the image element and the description element are each child elements of the table row element.

If the selected element is determined not to comprise the targeted element at stage 630, method 600 may advance to stage 640 where system 100 may identify the target element. In the example described above, identify element instructions 232 and/or element engine 340 may recognize the table row element as the targeted element even though the image was the selected element.

Once the targeted element is identified at stage 630 and/or stage 640, method 600 may advance to stage 650 where system 100 may generate an identifier (Id) for the targeted element. For example, application server 110 may create a copy of the data structure of the element using create modified copy instructions 234 and/or element engine 340 and apply modification rules to the copied structure to generate the identifier. Id generation is described in greater detail below with respect to FIG. 7.

Method 600 may then advance to stage 660 where system 100 may create a log record. For example, application server 110 may measure a metric associated with the action, such as the amount of time the action took to complete, using measure metric instructions 238 and/or action engine 330. Application server 110 may then create a log record comprising a name for the targeted element, the generated identifier, and the measured metric, and submit it to a log database. Method 600 may then end at block 670.

Figure 7:
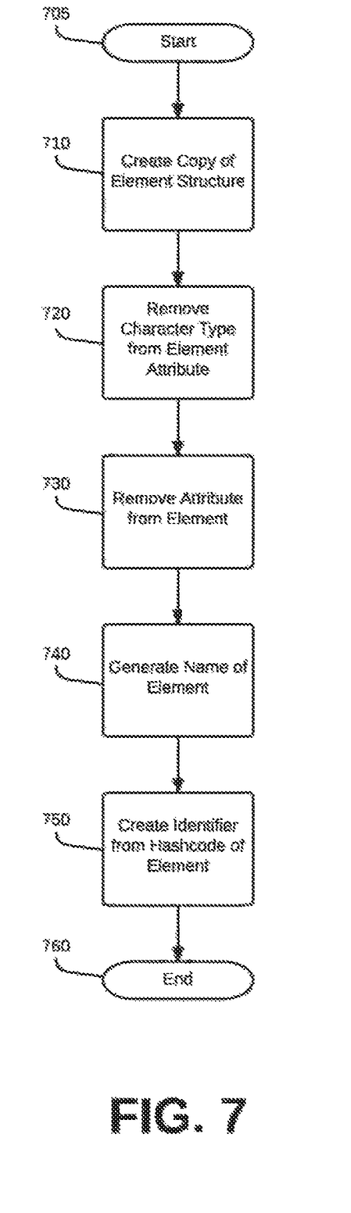
FIG. 7 is a flowchart of an implementation of a method for element identifier generation consistent with disclosed implementations.

FIG. 7 is a flowchart of an implementation of a method for generating an element identifier consistent with disclosed implementations. Although execution of method 700 is described below with reference to the components of system 100, other suitable components for execution of method 600 will be apparent to those of skill in the art. Method 700 may be implemented in the form of executable instructions stored on a machine-readable storage medium, such as machine-readable storage medium 220 of device 200.

Method 700 may start in block 705 and proceed to block 710, where system 100 may create a copy of an element's data structure. Using create modified copy instructions 234 and/or element engine 340, application 115 may create a new element data structure comprising the same data as the targeted element. For example, the targeted element may comprise child element 540(A) of DOM structure 500. Application 115 may create a copy of child element 540(A) for manipulation without affecting the original data structure. The copy of child element 540(A) may thus comprise the following nodes:

```
<li id="categoryProductItem_710406042_1016948" class="brand2 productCatItem">
  <div id="categoryProductItemImageContainer_710406042_10948 " class="brand2 facetedSearchImgDiv imgDiv">
    <a href="/browse/product.do?cid=1016948 ">
      <img id="cimg_710406_710406042_1016948_2" class="gridProdImg" alt="Black Shirt" src=http://a.b.c/abc/710406/quick/br7106-04qlv01.jpg name="cimg_710406_710406042_1016948_0_2 ">
    </a>
  </div>
  <a class="productItemName" href="/browse/product.do?cid=1016948">Black Shirt</a>
</li>
```

Method 700 may then advance to stage 720 where system 100 may remove a character type from an attribute of the element. For example, application 115 may, via create modified copy instructions 234 and/or element engine 340, apply a modification rule to the copy of the element that iterates over each node of the element and removes a character type such as underscores and/or numbers from strings from the end of each of the attributes. For the node "<li id="categoryProductItem_710406042_1016948" class="brand2 productCatItem">", this results in the node being modified to "<li id="categoryProductItem" class="brand2 productCatItem">".

For another example, the modification rule may remove text from the attribute. In the node "<a class="productitemName" href="/browse/product.do?cid=1016948">Black Shirt</a>"this results in the node being modified to"<a class="productitemName" href="/browse/product.do?cid=1016948"></a>".

For another example, the modification rule may remove parameters from a URL attribute. For the node "<a href="/browse/product.do?cid=1016948">", this results in the node being modified to "<a href="/browse/product.do">".

Once each of these modification rules has been applied, the copy of child element 540(A) may comprise the following nodes:

```
<li id="categoryProductItem" class="brand2 productCatItem">
  <div id="categoryProductItemImageContainer" class="brand2 facetedSearchImgDiv imgDiv">
    <a href="/browse/product.do">
      <img id="cimg" class="gridProdImg" alt="Black Shirt" src="http://a.b.c/abc/710406/quick/br7106-04qlv01.jpg" name="cimg">
    </a>
  </div>
```

Method 700 may then advance to stage 730 where system 100 may remove an attribute partially or in its entirety from the element. For example, modification rules applied by create modified copy instructions 234 and/or element engine 340 may remove "alt" attributes entirely and remove the value portion of "src" attributes. For the modified node <img id="cimg" class="gridProdImg" alt="Black Shirt" src=http://a.b.c/abc/710406/quick/br7106-04qlv01.jpg name="cimg">", this results in the node being modified to "<img id="cimg" class="gridProdImg" src=" " name="cimg">". Once each of these modification rules has been applied, the copy of child element 540(A) may comprise the following nodes:

```
<li id="categoryProductItem" class="brand2 productCatItem">
  <div id="categoryProductItemImageContainer" class="brand2 facetedSearchImgDiv imgDiv">
    <a href="/browse/product.do">
      <img id="cimg" class="gridProdImg" src="" name="cimg">
    </a>
  </div>
  <a class="productItemName" href="/browse/product.do"></a>
</li>
```

In some implementations, applying the above described modification rules to child element 540(B) may result in a modified data structure comprising the same nodes as those listed above with respect to child element 540(A).

Method 700 may then advance to stage 740 where system 100 may generate a name of the element. For example, element engine 340 may generate a name for the element according to a label, title, alt, class, and/or name attribute. In some implementations, the name for the element may be generated based on the type of element. For child element 540(A), for example, the "class" attribute of the first node may be used as a name for the element—"brand2 productCatItem".

Method 700 may then advance to stage 750 where system 100 may create an identifier from a hashcode of the element. For example, generate unique identifier instructions 236 and/or element engine 340 may comprise an implementation of a javascript hashcode function. Such a function operating on the modified data structure above may result in the value −211083241. Method 700 may then end at stage 760.

Figure 8:
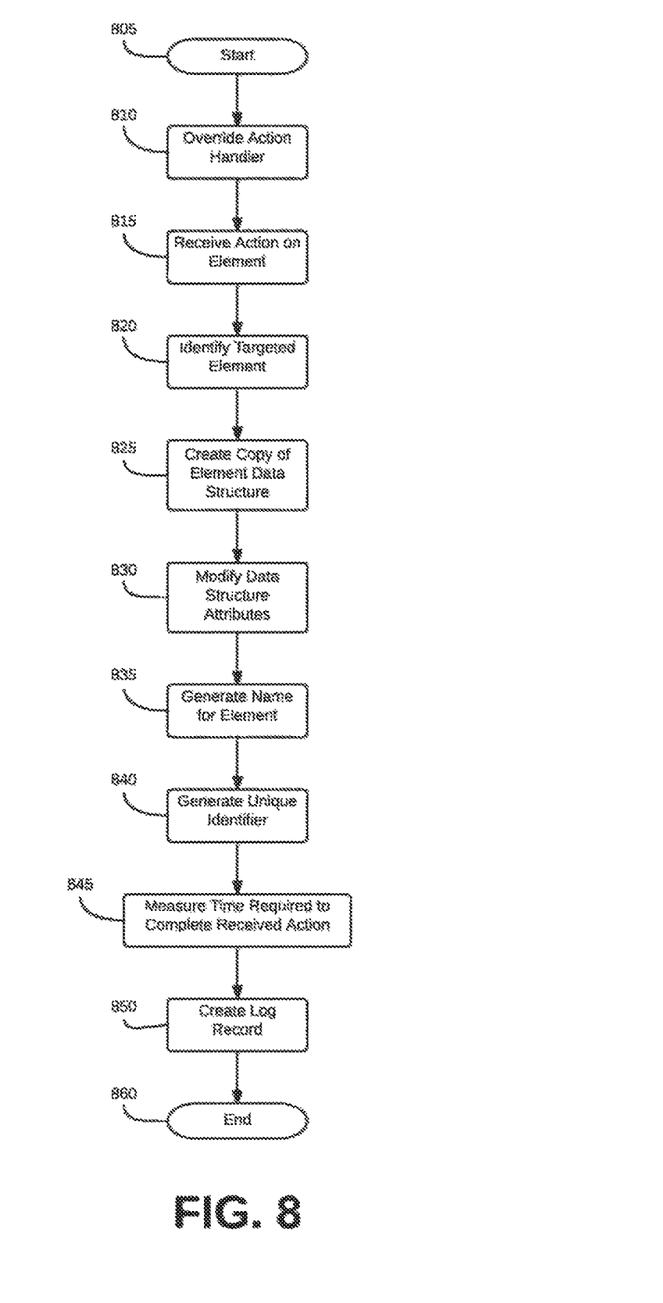
FIG. 8 is a flowchart of an implementation of a method for log record creation consistent with disclosed implementations.

FIG. 8 is a flowchart of an implementation of a method for log record creation, including elements 805, 810, 815, 820, 825, 830, 835, 840, 845, 850 and 860.

Although described above as comprising separate blocks, it should be apparent that the display of the particular interface areas need not occur in sequential order. Rather, in some implementations, the interface areas may be processed for display concurrently, such that some portions of a particular interface area are outputted to a display device prior to portions of another interface area.

The disclosed examples may include systems, devices, computer-readable storage media, and methods for progressive buffer generation. For purposes of explanation, certain examples are described with reference to the components illustrated in FIGS. 1, 2 and 3. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Moreover, as used in the specification and the appended claims, the singular forms "a," "an," and "the" are intended to include the plural forms as well, unless the context indicates otherwise. Additionally, although the terms first, second, etc. may be used herein to describe various elements, these elements should not be limited by this terms. Instead, these terms are only used to distinguish one element from another.

Further, the sequence of operations described in connection with FIGS. 1-8 are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples. All such modifications and variations are intended to be included within the scope of this disclosure and protected by the following claims.

According to the implementations described in detail above, systems and methods for generating element identifiers and logging measured metrics for applications are disclosed.

We claim:

1. A system for element identifier generation and performance log generation, the system comprising:
   a processor;
   a non-transitory computer readable medium storing instructions that when executed cause the processor to:
      an action engine to:
         receive an action associated with an element of a structured document of an application; and
         measure a metric associated with the received action;
      an element engine to:
         determine whether the element comprises a targeted element, including to:
            determine whether the element comprises a plurality of child elements; and
            determine whether an amount of display space occupied by the element exceeds a threshold amount;
      in response to determining that the element comprises the targeted element, generate a unique identifier according to a modified attribute of the element and a log engine to create a log record comprising the unique identifier and the metric associated with the received action.

2. The system of claim 1, wherein the instructions, when executed, cause the processor to
   generate a name for the element, wherein the log record further comprises the generated name.

3. The system of claim 1, wherein the instructions, when executed, cause the processor to generate the unique identifier according to the modified attribute of the element by removing a character type from the attribute.

4. The system of claim 1, wherein the instructions, when executed, cause the processor to generate the unique identifier according to the modified attribute of the element by removing a second attribute of the element.

5. The system of claim 4, wherein the second attribute comprises at least one of the following: a style attribute, an alt attribute, a link attribute, and a source attribute.

6. The system of claim 1, wherein the instructions, when executed, cause the processor to generate the unique identifier according to the modified attribute of the element by creating a hash code according to the element.

7. The system of claim 1, wherein the instructions, when executed, cause the processor to, in response to determining that the element does not comprise the targeted element, identify a second element as the targeted element.

8. A non-transitory machine-readable storage medium including instructions for element identifier generation and performance log generation which, when executed by a processor, cause the processor to:
   detect an action associated with a structured document,
   identify an element of the structured document associated with the action, including to:
      identify a selected element associated with the action; and
      determine whether the selected element comprises a plurality of child elements; and
      determine whether an amount of display space occupied by the selected element exceeds a threshold amount;
   create a modified copy of the identified element;
   generate a unique identifier associated with the modified copy of the identified element;
   measure a metric associated with the action; and
      create a log record comprising the unique identifier and the measured metric associated with the action.

9. The non-transitory machine-readable storage medium of claim 8, wherein the measured metric associated with the action comprises an amount of time taken to complete the action.

10. The non-transitory machine-readable storage medium of claim 8, wherein the instructions to identify the element of the structured document associated with the action comprise instructions to
   determine whether the selected element comprises a targeted element.

11. The non-transitory machine-readable storage medium of claim 8, wherein the instructions to generate the unique identifier associated with the modified copy of the identified element comprise instructions to:
   create a copy of a data structure associated with the identified element;
   apply a modification rule to the copy of the data structure;
   generate a name for the identified element; and
   convert the copy of the data structure to a hash code.

12. The non-transitory machine-readable storage medium of claim 11, wherein the modification rule comprises at least one attribute to be removed from the copy of the data structure.

13. A computer-implemented method for element identifier generation and performance log generation, the computer-implemented method comprising:
   overriding, by an action engine, an action handler associated with a plurality of elements of a structured document of an application;
   receiving, by the action engine, an action associated with an element of the plurality of elements via the action handler;
   identifying, by an element engine, a targeted element for the received action, including determining whether the targeted element comprises a plurality of child elements and determining whether an amount of display space occupied by the targeted element exceeds a threshold amount;
   creating, by the element engine, a copy of a data structure of the targeted element;
   modifying, by the element engine, a plurality of attributes of the copied data structure according to a modification rule;
   generating, by the element engine, a name for the targeted element;
   generating, by the element engine, a unique identifier for the targeted element according to a hash code of the modified plurality of attributes of the copied data structure; measuring, by the action engine, an amount of time required to complete the received action on the targeted element; and
   creating, by a log engine, a log record comprising the generated name and the unique identifier.

14. The computer-implemented method of claim 13, wherein the modification rule comprises at least one of the following: removing an attribute from the plurality of attributes, removing a character type from an attribute of the plurality of attributes, and removing a field-value string from an attribute of the plurality of attributes.

* * * * *